United States Patent [19]

Williams

[11] Patent Number: 4,961,284
[45] Date of Patent: Oct. 9, 1990

[54] VERTICAL GARDEN

[76] Inventor: Bruce Williams, Post Office Address: Rte. 109A, Center Tuftonboro, N.H. 03816

[21] Appl. No.: 242,100

[22] Filed: Sep. 9, 1988

[51] Int. Cl.⁵ .............................................. A01G 9/02
[52] U.S. Cl. ........................................ 47/66; 47/79; 47/83
[58] Field of Search .................. 47/66, 70, 78, 79, 82, 47/83, 45, 47; 24/453

[56] References Cited

U.S. PATENT DOCUMENTS

| | | | |
|---|---|---|---|
| 2,756,541 | 7/1956 | Berger | 47/83 |
| 3,063,196 | 11/1962 | Pauer | 47/82 |
| 3,238,586 | 3/1966 | Stoffel | 24/453 |
| 3,373,525 | 3/1968 | Cavataio | 47/27 |
| 3,685,204 | 8/1972 | O'Harra | 47/47 |
| 4,065,876 | 1/1978 | Moffet | 47/83 |
| 4,161,085 | 7/1979 | Moffet | 47/82 |
| 4,268,994 | 5/1981 | Urai | 47/79 |
| 4,404,767 | 9/1983 | Enrich | 47/67 |

FOREIGN PATENT DOCUMENTS 2055281  3/1981  United Kingdom .................. 47/83

Primary Examiner—Robert A. Hafer
Assistant Examiner—Lynda M. Cofsky
Attorney, Agent, or Firm—Nolte, Nolte and Hunter

[57] ABSTRACT

A plant growing receptacle including a frame of rigid self supporting material, having an open top and closed bottom, a custom shaped liner having open top and sealed bottom that is inside and closely fitting to the frame, and plant growing medium in the liner occupying a substantial portion of its volume. Framing openings in the front face of the frame. Holes in the liner at a number of the framing openings. A vertically oriented tube in the growing media, sealed at the bottom end, open at the top end, and having openings along its length, larger toward its top than toward its bottom, for delivering water to the growing medium. Slats in the frame for rigidity and for defining the framing openings. Means for hanging the liner in the frame.

3 Claims, 2 Drawing Sheets

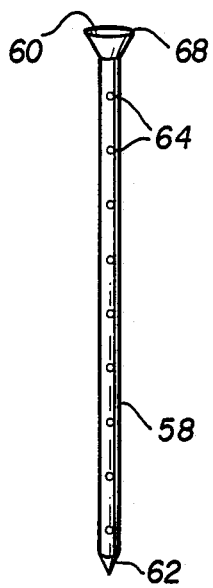
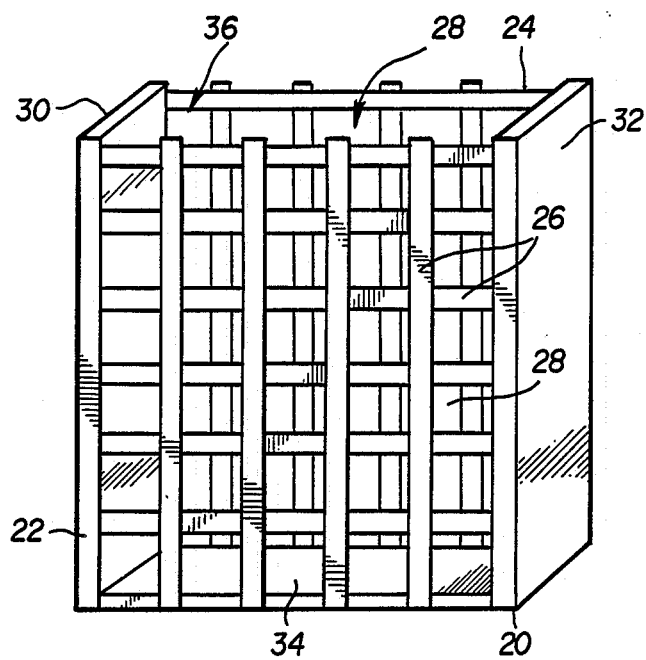
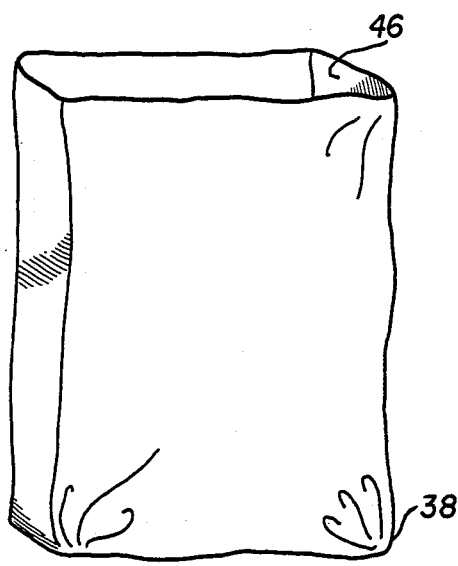
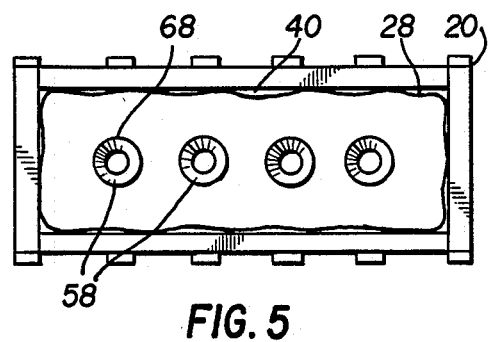

VERTICAL GARDEN

BACKGROUND OF THE INVENTION

1. Field of the Invention

This invention relates in general to plant husbandry, more particularly to a self moisturizing vertical array plant receptacle for presenting plant growth and both vertical and horizontal planes.

2. Description of the Prior Art

There has been considerable interest in planters for presenting vegetation in a vertical plane for aesthetics and for use in environs having limited ground space, as evidenced by a considerable number of patents in this area.

U.S. Pat. No. 2,756,541, issued to E. Berger, July 31 1956, describes a container for growing strawberry plants which he points out is an improvement over previous strawberry barrels made by including holes in the sides of barrels made of wood or clay, filling the barrels with soil and growing strawberry plants in the soil so that the plants grow out of the barrels through side openings in the barrels. He points out that the bottom portions of the sides of the strawberry barrel slope inwardly so that the soil in the barrel tends to fall out through the openings. He therefore provides a plant container comprising four latticework sides joined together to make the container, each side of the container sloping inwardly toward the container's upper end so that the container is substantially larger in the horizontal cross section area at its bottom than at its top. This holds the soil in the container so that it does not fall out through the openings formed between the members of the latticework. Also included are inwardly extending horizontal shelves, located above the openings in the latticework to further prevent the soil from falling out of the openings immediately below the shelves. A pipe, having holes plugged by wicks of hemp, asbestos, cotton or other suitable material, is positioned vertically within the container, and extends through the center to the top, or above the top of the container to provide water for the plants. Guy wires may also be included across the interior of the container to provide rigidity.

U.S. Patent No. 3,063,196, issued to E. E. Pauer, Nov. 13, 1962, provides a plant receptacle with an improved moistening system comprising a vertical outer shell with a vertical central tube being partitioned into three sections. The top section includes an annular chamber for adding water which dispenses water at the top of the container to soil contained between the outer walls and the central tube. The next lower section of the tube includes openings for passing water to the soil surrounding that portion of the tube, and the lower portion of the tube is sealed, thereby providing no water to the soil. The bottom of the container has a plate with through holes for draining excess water in the soil to a container below which supports the plate. The contour shape of the outer shell can be varied as desired and the outer shell contains pockets with openings to the soil for inserting plants so that they are presented though the outer wall. The central tube provides differential watering, with a greater amount of water fed from the annular chamber to the upper portion of the soil which tends to dry more quickly, while the next lower portion of the soil is watered by the openings in the next lower portion of the tube. The water in the soil percolates down past the sealed portion of the tube, and on through the plate where it is delivered to the supporting container as overflow, tending to provide more uniform water distribution throughout the soil. Water is introduced to the receptacle by adding it both into the tube and the upper chamber. The holes in the middle level and bottom plate, also provide aerating access to the soil.

U.S. Pat. No. 3,685,204, issued to Russell L. O'Harra, on Aug. 22, 1972, provides a soil filled base, supporting a vertical body of any desired shape filled with sphagnum moss. The body includes through openings in its outer surface. The system is designed to support climbing vines such as ivy which extends roots along its length as it grows. The ivy is planted in the base, and as the vine grows, its leafy portion is clipped to the body by clips inserted through the through openings. Thus held to the surface of the body, the vine extends roots through the outer surface of the body and into the sphagnum moss by way of the openings in the outer surface, as it grows upward over the outer surface of the body. The sphagnum moss within the body or "totem" is watered from the top.

U.S. Pat. No. 4,161,085, issued to F. Wesley Moffett, Jr., on July 17, 1979, provides a container having flexible vertical walls with through openings. Each opening has a flexible cover slip over it to prevent escape of growing medium from the container, and to allow access to the growing media for insertion of seeds and for extension of plant growth through the openings. Tie rods running through the soil to opposite outer sheets contribute to holding desired shapes. For added strength, the container's walls are attached to steel posts driven into the ground upon which the container rests.

U.S. Pat. No. 4,268,994, issued to Muneharu Urai, on May 26, 1981, discloses a planter having a vertical frame filled with soil or other growing medium in the form of a cultivating body and set in a trough for collecting excess liquid. A reservoir at the top of the housing provides water for the growing medium for delivery to the medium by openings in the container, or by a wick.

At least one wall of the frame provides a vertically disposed opening to the cultivation body, the opening having an area greater than one half the area of the wall. The cultivation body comprises a composition which retains its integrity over the area exposed at the vertically disposed opening. For example, if the cultivation body is loose soil or sand, its exposed outer layer may be made from foam or other material which will hold the culture material together and provide air, ventilation and water drainage. This layer may also be made from textile, net, filament, porous board, silicic soil, clay, peat moss, sphagnum moss or other mosses, or an adhesive agent may be used to hold the cultivation body together. Within the housing, means for moistening the cultivation body include upwardly angled water retention boards, forming water holding troughs within the enclosure.

U.S. Patent No. 4,065,876, issued to F. Wesley Moffett, Jr., discloses a Portable Garden. It has a first embodiment comprising a vertical wire frame located on a horizontal wire screen, which is on a planar member that has a corrugated bumpy upper surface. Within the vertical screen is a waterproof cylindrical liner formed by rolling a rectangular section of vaporproof paper into the shape of a tube that is open on the top and bottom. Slits are cut in the waterproof tube's sides to permit placing seeds for sprouting through the openings. The tube is filled with soil and has within it water supplying tube.

A second embodiment includes a planar disk having openings. A vertical mast section at the center of the disk is surrounded by a hub and vertical, triangular plates mounted on the perforated disk. A plastic bag envelops this assembly. The bag is filled with earth, and includes tubing for adding moisture to the soil. Holes are cut into the sides of the bag for inserting seeds and for the shoots to emerge. The bag assemblies may be stacked one above the other, wherein the central mast penetrates the bottom of the bag above.

U.S. Pat. No. 4,404,767, issued to Carlos W. Enrich, on Sept. 20, 1983, provides a flexible vertical tube having a reservoir at its uppermost end, and a collection container at its lowermost end with a wick running between the two through a growing medium within the tube. The wick is disposed generally adjacent to the inner side of the tube so as to be adjacent to a vertical support member located outside the tube extending between the reservoir and the collection container. The tube wall, comprising flexible sheet material such as polyethylene, includes a vertical, external seam that is stapled to the support member. The wick, therefore, is located within the medium, close to the seam.

In one embodiment, openings are provided through the flexible wall of the tube to permit growth from seedlings in the medium to extend through the openings to the region outside the flexible wall.

In another embodiment, the tube is cut horizontally into sections, with the resulting medium filled segments alternately displaced from a vertical central axis so that they provide horizontal portions of medium for vertical plant growth. Because the wick is located close to the seam, near the axis of rotation for displacement of the segments, it is not damaged by either the cutting to create the segments, or by the rotating of the segments. Location of the wick at a farther wall from the plant growth site facilitates removal of a plant with minimum damage to its root system. Separation of the wick from the root end is facilitated by drawing the wick up and down before plant removal.

Prior art planters provide a growing environment for vertical planting by variously incorporating sloped wooden walls, bonded media, or cover flaps over flexible plastic outer walls to avoid loss of growing medium from the container. For moistening the growing medium they variously incorporate reservoirs at their top to provide pressure head, sloped inner-shelf troughs, partitioned central pipes with annular reservoirs, and various wick-water delivery systems. They incorporate flexible walls supported by cross bars or tie rods, and are bound around their outer surface by flexible rods, tubes or wire. Their containment is generally open on the bottom for drainage, incorporating strainer plates. They further include various vertical internal supporting members including tubes and vertical plates.

SUMMARY OF THE INVENTION

The present invention comprises a simple, easy to make plant growing receptacle for providing presentation of plant growth in both vertical and horizontal planes, and controlled watering of the growth medium, without need for costly supports, and complicated water delivery and collection systems.

It is one objective of the present invention to provide a vertical garden plant growing receptacle having a rigid, fully supporting outer frame, which includes framing openings on at least one vertical plane for presenting plant growth.

It is another objective of the invention to provide a vertical garden plant growing receptacle with an independent, removable custom fit waterproof liner for holding plant growth medium.

It is another object of the present invention to provide the growing receptacle with a rigid fully supporting outer frame having a whole bottom, and a custom fit removable waterproof liner having a sealed bottom.

It is still another object to provide the growing receptacle with rigid fully supporting outer frame having a whole bottom, a custom fit removable waterproof liner having a sealed bottom, with at least one vertical wall containing slats defining framing openings for plant presentation and openings through the liner for plant access to the framing openings for plant presentation.

Another object of the present invention is to provide the growing receptacle with a moistening system comprising at least one vertical tube having a sealed bottom, with holes of increasing size from bottom to top, located in the growing media for even moisturization of the growing media.

Yet another object is to provide the planter with vertical and top horizontal access to growing medium for presentation of plant vegetation in both vertical and horizontal planes.

Accordingly, in a preferred embodiment, there is provided a self watering, vertical array, plant growth receptacle having a frame of rigid self supporting material. The frame has an open top and a closed bottom. A custom shaped liner, made from water resistant material, and having an open top and sealed bottom, closely fits the inside of the frame. Plant growing medium is located in the liner, occupying a substantial portion of its volume.

The front and rear faces of the frame include a plurality of framing through openings for access to the liner so that it can be punctured at the openings for presenting plant growth that is in the medium, by way of the framing openings.

At least one face includes intersecting slats for rigidity and for defining the framing openings.

At least one tube, sealed at a first end, open at a second end for receiving water, and having a plurality of openings along its length which are larger near the second end than those nearer the first end, for delivering water to the growing medium, is located in the plant growing medium. It is oriented generally vertically and on a centerline between two opposing faces, with the first end downward.

In another embodiment, the frame includes intersecting slats to provide rigidity and to form the front face and rear face framing openings.

In another embodiment, the self watering, vertical array, plant growing receptacle is provided as a kit, including a frame and a liner as described above. Packaging for the kit may be as simple as employing the frame, is the outer package or may be more elaborate, even to including an instrument for puncturing the liner.

Plant growing medium, in a quantity sufficient to fill the liner to a height that includes a plurality of the framing openings when the liner is installed in the frame, may also be supplied as part of the kit.

Reversible fastening means are provided at an upper edge of the frame for attaching the top of the liner to the frame. One example of the reversible fastening means is knobs on the inside of the frame, near the top of the frame, and cooperating holes formed in the liner near the top of the liner for hanging the liner from the knobs.

In still another embodiment of the invention, the liner is provided with a plurality of punctures in a portion of it between its top and its bottom, at a height that includes a plurality of the framing openings when the liner is installed in the frame.

BRIEF DESCRIPTION OF THE DRAWINGS

In order that the invention be more fully comprehended, it will now be described, by way of example, with reference to the accompanying drawings, in which:

FIG. 2 is a perspective view of a combination support and presentation frame according to the invention.

FIG. 3 is a perspective view of a custom fit waterproof liner for custom installation in a combination support and presentation frame.

FIG. 4 is a perspective view of an insertable moistening tube.

FIG. 5 is a top plan view of the combination support and presentation frame with custom fit waterproof liner, insertion tube and growth media installed.

DESCRIPTION OF THE PREFERRED EMBODIMENT

Figure 6:
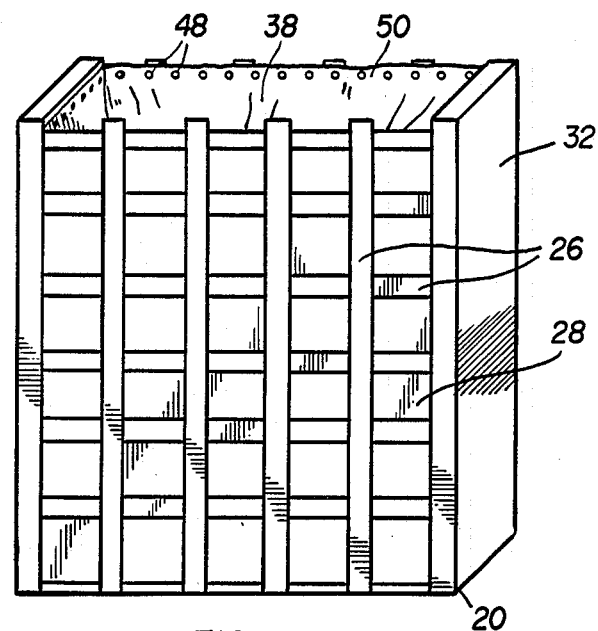
FIG. 6 is a perspective view of a combination support and presentation frame with a waterproof liner installed and hanging by reinforced holes around the top of the liner, from knobs on the inside top of the frame.
Figure 1:
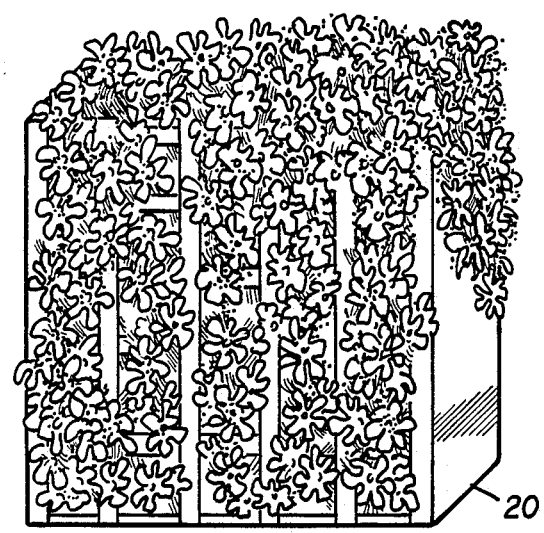
FIG. 1 is a perspective view of a preferred embodiment of the invention with plant presentation in horizontal and vertical planes.

Referring to the drawings, FIG. 1 shows an assembled vertical garden with vegetation presented in a horizontal plane and a vertical plane. As shown in FIG. 2, it includes a frame 20, of wood, aluminum or other rigid self supporting material, in the shape of a vertical box, having front and back faces 22 and 24, comprising slats 26 organized in horizontal and vertical patterns defining framing openings 28 through the wall. To permit side by side arrangement of planters, and to allow positioning close to a wall, the left and right side walls 30 and 32 may be solid. The bottom 34 of the box is solid while the top 36 is open, as plant growth is presented through openings 28 and over the top opening As shown in FIG. 1, the plant growth may also flow down over the sides.

The plantings are seeded or installed in a plant growing medium such as peat moss and vermiculite, that is placed in custom fit waterproof liner 38. The liner is custom designed to fit the interior dimensions of frame 20.

Referring to FIGS. 3 and 5, custom fitted waterproof liner 38 expands to fit the inner side 40 of frame 20. When growing medium is added, it applies pressure against the inside surface 46 of the liner which expands to press against the frame. Intimate contact of the waterproof liner 38 against the inside of frame 20, prevents undesirable protrusion of plant growth into the space between the liner and the frame, which becomes unsightly as leaves strangle when so entrapped.

To establish foliage growth, seeds or seedlings are inserted directly into the top of the medium in the liner for presenting foliage at the top of the frame, and are inserted through punctures made in selected portions of the liner behind framing openings 28 to present foliage in a vertical plane. The punctures are simply made with a sharp instrument such as a trowel or knife once the liner and medium are installed in the frame.

Although it is preferable that the punctures fall within the framing openings, it is acceptable for some punctures to be out of alignment with the framing openings because pressure of the liner against the frame will suppress undesirable growth from those punctures. According to a therefore less preferred embodiment of the invention, the liner is punctured outside of the frame.

Figure 7:
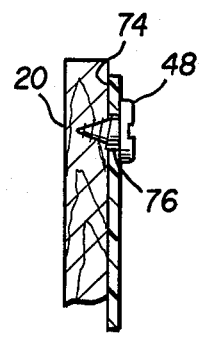
FIG. 7. is a cross sectional view of a liner top hanging from a knob that is screwed into the top of a frame.

The liner is held in the frame by reversible fastening means 48, located at the upper edge of the frame 50, such as the knob 72 shown in FIG. 7, screwed in to the upper, inner surface 74 of frame 20 for hanging the liner 38 by reinforced holes 76 which are located around the top of the liner. Although knobs are show and described, other reversible fastening means may be used, such as snaps or hooks. The liner, being easily removable, can be replaced with another having a different side opening configuration and plant type. At times it is necessary to cut away some of the plantings or pull them out through the framing openings to permit liner removal.

Moistening is provided by one or more insertable moistening tubes 58 such as the one shown in FIG. 4. The tube is open at top end 60 for receiving water, and is sealed and pointed at lower end 62 for easy insertion. Holes 64 are provided along the length of the tube for releasing water into the growth medium. The upper part of the tube experiences lower hydrostatic pressure than the lower part of the tube due to the weight of the column of water. The upper holes therefore are larger than the lower holes so that water delivery to the growth medium is about the same from each hole. It is also within the contemplation of the invention to further adjust the hole sizes to allow for increased rate of moisturization of the upper portion of the medium to account for evaporation. The tubes are filled at their funnel tops, or by any ancillary method such as pretimed valve from a central water supply system.

FIG. 5 shows a preferred tubing arrangement, wherein the tubes are located equidistant from one another along a center line of growth medium. The distances between each tube, and between the end tubes and the inner surfaces of the side walls are selected to maintain sufficient, and variable wetting of all the growth medium which gives up its moisture at different rates due to root absorption and evaporation. Growing medium close to the sealed left and right side walls and the bottom of the plant receptacle tends to become more saturated. It serves as a water reserve, providing the water to less saturated soil by capillary action between waterings. Eventually the more remote growing medium receives root growth.

By the above description it is seen that this invention provides a vertical garden plant growing receptacle which is easy to make and assemble, which locates anywhere without concern over leakage, and yet which provides a rigid fully supporting outer frame having openings in a front wall, sealed bottom, a custom fit, removable waterproof liner that is open at the top with openings in its walls coinciding with selected openings in the front and back walls, for presentation of vegetation vertically from the front and back walls and horizontally at the top of the receptacle.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

What is claimed is:

1. A self-watering, vertical array, plant growing receptacle comprising:

a frame, constructed of rigid self-supporting material, said frame having substantially vertical faces including side and front faces, a top that is open, and a bottom that is closed; a liner, custom-shaped to closely fit the inside of the frame to form side and front walls, located in the frame, said liner being made from water resistant material, and having a top that is open and a bottom that is sealed, said liner being adapted to contain plant growing medium within the liner and occupying a substantial portion of the volume within the liner, at least one of said faces defining a plurality of vertically arranged framing openings for access to said liner for puncturing said liner through said framing openings for presenting plant growth in a vertical plane in the medium by way of said framing openings, a plurality of tubes, each sealed at a first end, open at a second end for receiving water, and having a plurality of openings along their length for delivering water to said plant growing medium, said tubes being located in the plant growing medium and oriented generally vertically with the first end downward so that said openings at various depths correspond to certain of said framing openings, said openings in said generally vertically oriented tubes being smaller at the lower part of the tube than those toward the upper part of the tube to provide substantially the same water delivery at the lower hydrostatic pressure at the upper part of the tube as at their lower ends of greater hydrostatic pressure to plant growth presented in a vertical plane through said framing openings at several depths corresponding to said tube openings, said plurality of tubes being located equally distant from one another along a center line in said growth medium, the distances between each tube and between the end tubes and the inner surfaces of the side walls being selected to maintain wetting of all the growth medium so that remote growing medium receives root growth.

2. The self watering, vertical array, plant growing receptacle according to claim 1, further comprising:

said frame including reversible fastening means at an upper edge for attaching the top of the liner to the frame.

3. A self watering, vertical array, plant growing receptacle according to claim 2, further comprising:

said reversible fastening means including knobs on the inside of the frame near the top of the frame, said liner including holes near the top of the liner for hanging the liner from the knobs.

* * * * *